United States Patent
McEvoy et al.

(10) Patent No.: US 9,249,888 B2
(45) Date of Patent: Feb. 2, 2016

(54) NON-WELDED HARDFACE GATE AND SEATS

(71) Applicant: GE Oil & Gas Pressure Control LP, Houston, TX (US)

(72) Inventors: Travis Kyle McEvoy, Houston, TX (US); Lloyd Ray Cheatham, Houston, TX (US); Ben Calvin Holgate, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 84 days.

(21) Appl. No.: 14/158,323

(22) Filed: Jan. 17, 2014

(65) Prior Publication Data

US 2015/0204448 A1    Jul. 23, 2015

(51) Int. Cl.
*F16K 3/02* (2006.01)
*F16K 27/02* (2006.01)

(52) U.S. Cl.
CPC .............. *F16K 3/0227* (2013.01); *F16K 3/0236* (2013.01); *F16K 3/0245* (2013.01); *F16K 3/0263* (2013.01); *F16K 27/0272* (2013.01)

(58) Field of Classification Search
CPC . F16K 3/0227; F16K 3/0245; F16K 27/0272; F16K 3/0236; F16K 3/0263; Y10T 137/7036
USPC .................... 251/326–329; 137/375
See application file for complete search history.

(56) References Cited

U.S. PATENT DOCUMENTS

| | | | | |
|---|---|---|---|---|
| 1,995,727 A | * | 3/1935 | Wetherbee | 137/340 |
| 3,143,132 A | * | 8/1964 | Pangburn | 137/375 |
| 3,334,650 A | * | 8/1967 | Stewart, Jr. et al. | 137/375 |
| 3,349,789 A | * | 10/1967 | Crain et al. | 137/246.22 |
| 3,889,925 A | * | 6/1975 | Brooks | 251/327 |
| 3,985,150 A | * | 10/1976 | Kindersley | 137/240 |
| 4,281,819 A | * | 8/1981 | Linder | 251/328 |
| 4,412,671 A | | 11/1983 | Tiefenthaler | |
| 4,458,879 A | * | 7/1984 | Jandrasi | 251/326 |
| 4,595,031 A | | 6/1986 | Arens et al. | |
| 4,911,410 A | * | 3/1990 | Baker | 251/327 |
| 4,997,162 A | | 3/1991 | Baker et al. | |

(Continued)

FOREIGN PATENT DOCUMENTS

DE    9414158 U1    12/1994
DE    19701849 C1   4/1998

(Continued)

OTHER PUBLICATIONS

PCT Search Report and Written Opinion issued in connection with corresponding Application No. PCT/US201415832 on Apr. 14, 2015.

*Primary Examiner* — John Bastianelli
(74) *Attorney, Agent, or Firm* — Bracewell & Giuliani LLP (57) ABSTRACT

A gate valve includes a valve body with a flow passage intersected by a gate cavity. The gate valve also includes a gate with a gate body. The gate body has a downstream gate body face, and an upstream gate body face on an opposite side of the gate body. A seat ring is located between each gate body face and the valve body, at the intersection of the flow passage and the gate cavity. Each seat ring has a seat ring face proximate to the gate. At least one removable insert is located between one of the seat ring faces and one of the gate body faces. The insert is removably coupled to one of the faces and formed of a material harder and more wear resistant as compared to the gate body and the seat ring.

20 Claims, 5 Drawing Sheets

(56) References Cited

U.S. PATENT DOCUMENTS

| | | | |
|---|---|---|---|
| 5,370,362 A * | 12/1994 | Kent et al. | 251/326 |
| 5,501,424 A * | 3/1996 | Williams et al. | 251/326 |
| 7,481,239 B2 * | 1/2009 | McGuire et al. | 251/327 |
| 7,849,874 B2 * | 12/2010 | Kuwata et al. | 137/375 |
| 2012/0261603 A1 | 10/2012 | Kahn et al. | |
| 2012/0291877 A1 | 11/2012 | Meek | |
| 2012/0318528 A1 | 12/2012 | Wolfe et al. | |

FOREIGN PATENT DOCUMENTS

| | | |
|---|---|---|
| EP | 0417877 A1 | 3/1991 |
| JP | 57116976 A | 7/1982 |

* cited by examiner

NON-WELDED HARDFACE GATE AND SEATS

BACKGROUND

1. Field of the Disclosure

The present disclosure relates in general to valves and more particularly, to inserts on sealing surfaces of gate valves for use with oil, gas and other fluids.

2. Description of Prior Art

A gate valve has a body with a flow passage extending through it. A gate cavity intersects the flow passage, and seat rings are located at the upstream and downstream points of intersection. An actuator, which may be mechanical, hydraulic or electrical, moves a gate within the cavity between open and closed positions. The gate has an aperture through it. When in the open position, the aperture registers with the flow passage. In the closed position, a seal surface on the gate contacts the downstream seat ring. The upstream pressure exerts a force pushing the seal surface into tight sealing engagement.

When the operator begins to open the gate valve from the closed position to the open position, the seal surface of the gate slides across the seat ring as the gate moves to the open position. The upstream pressure force continues to act on the gate until the aperture reaches the seat rings and the pressure across the gate equalizes. If the upstream pressure force is high, a considerable friction force results even if the seal surface and the seat rings are smooth surfaces and lubricants are employed. This is especially true when dirt and other debris in the fluid is trapped between the gate and the seat ring. This frictional force can damage the seal surfaces of the seat ring and gate, shortening the life of the valve. Forming the gate and seat ring entirely of more wear resistant material can be cost prohibitive.

SUMMARY OF THE DISCLOSURE

Embodiments of the current disclosure provide for replaceable preformed inserts that act as sealing surfaces to be attached to the seat rings and gate. These inserts are formed of a material that is more wear resistant than the material of the seat rings and gate. The inserts are removable and can be replaced if damaged or can be reused on other gates.

In one embodiment of the current disclosure, a gate valve includes a valve body with a flow passage intersected by a gate cavity. The gate valve also includes a gate with an axis and a gate body. The gate body has a downstream gate body face, and an upstream gate body face on an opposite side of the gate body. The gate is axially movable in the gate cavity between a gate closed position and a gate open position. The gate has a gate opening that registers with the flow passage when the gate is in the gate open position. A seat ring is located between each gate body face and the valve body, at the intersection of the flow passage and the gate cavity. Each seat ring has a seat ring face proximate to the gate. At least one removable insert is located between one of the seat ring faces and one of the gate body faces. The insert is removably coupled to one of the faces and formed of a material harder and more wear resistant as compared to the gate body and the seat ring.

In another embodiment of the current disclosure, a gate valve has a valve body with a flow passage intersected by a gate cavity. The gate valve also includes a gate with an axis and a gate body. The gate body has a downstream gate body face, and an upstream gate body face on an opposite side of the gate body as the downstream gate body face. The gate is axially movable in the gate cavity between a gate closed position and a gate open position. The gate has a gate opening that registers with the flow passage when the gate is in the gate open position. A seat ring is located between each gate body face and the valve body, at the intersection of the flow passage and the gate cavity. Each seat ring has a hole extending through the seat ring that registers with the flow passage of the valve body, and a seat ring face proximate to the gate. At least one of the seat ring faces forms a sealing interface with the gate. At least one removable insert is located at the sealing interface between one of the gate body faces and one of the seat ring faces. The insert is formed of a material harder and more wear resistant as compared to the gate body and the seat ring In yet another embodiment of the current disclosure, a gate valve includes a valve body with a flow passage intersected by a gate cavity. The gate valve also has a gate with an axis, a gate body, a downstream gate face, and an upstream gate face on an opposite side of the gate body as the downstream gate face. The gate is axially movable in the gate cavity between a gate closed position and a gate open position. A seat ring is located between each gate face and the valve body, at the intersection of the flow passage and the gate cavity. Each seat ring has a hole extending through the seat ring that registers with the flow passage of the valve. At least one gate face comprises a removable gate insert formed of a material harder and more wear resistant as compared to the gate body, the gate insert having an inner surface that engages an outer surface of the gate body. A plurality of elongated mating ribs and channels are located on the gate insert and the gate body. The ribs and channels have mating shoulders to prevent the gate insert from being moved away from the gate body in a direction normal to a plane containing an outer surface of the gate body.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown.

The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
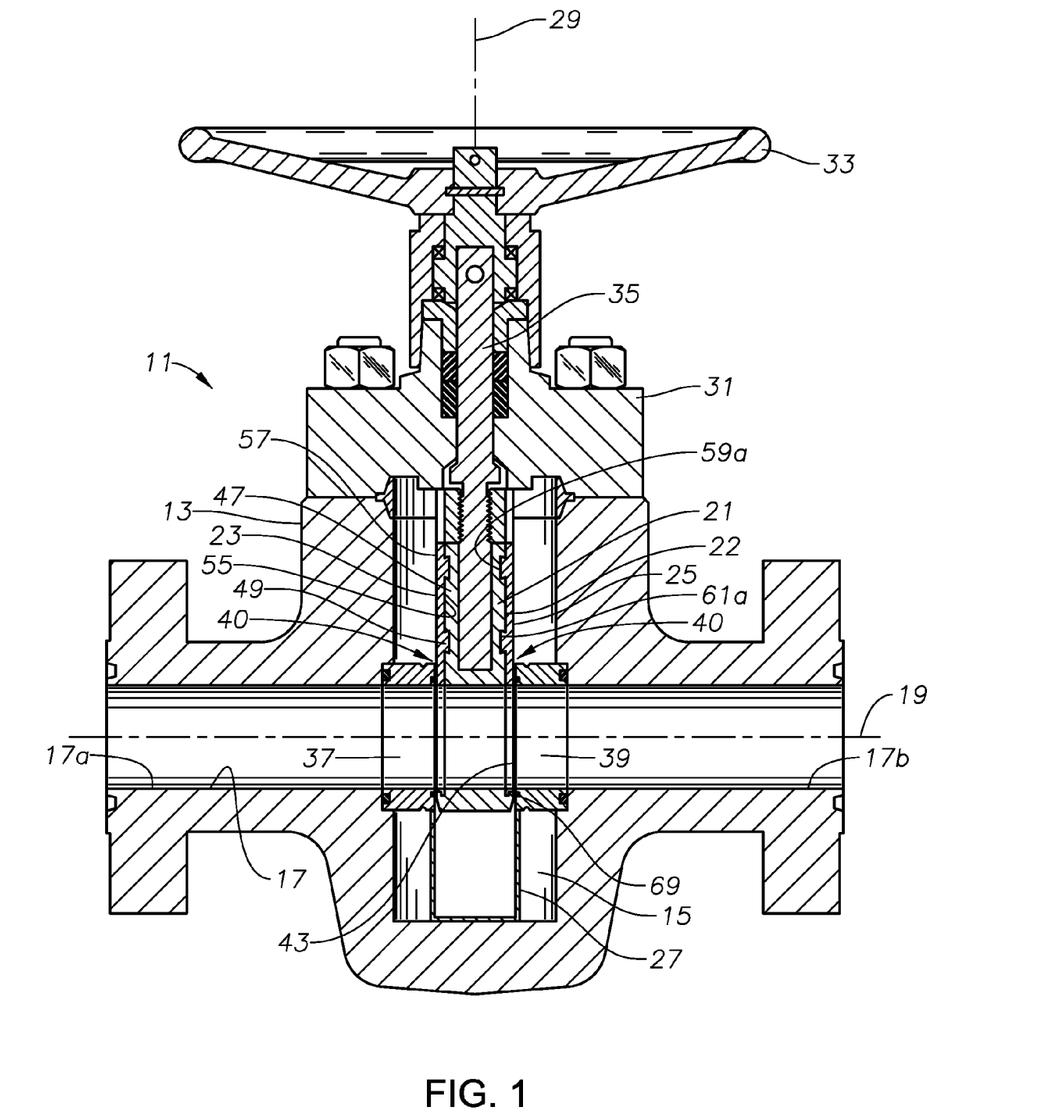
FIG. 1 is a sectional view of a gate valve in a gate open position constructed in accordance with an embodiment of this disclosure.

Referring to FIG. 1, valve 11 has a valve body 13 with a gate cavity 15 located therein. Valve 11 can be, for example associated with a wellhead assembly that is disposed over a well. The wellhead assembly can include a wellhead housing, a production tree over the housing and flow lines connected to the tree or the wellhead assembly. The flow lines and wellhead assembly can include embodiments of valve 11 described herein. Valve 11 can also be used for regulating fluids, such as a fracturing fluid, that are designated for entry into the wellhead assembly. The wellhead assembly can be at surface or can be subsea.

A flow passage 17 is defined by flow line passages 17a, 17b, which extend through body 13, are coaxial with each other about an axis 19 and intersect gate cavity 15. A gate 21 is carried within cavity 15 for movement in a plane perpendicular to axis 19 of flow line passages 17a, 17b. Gate 21 is generally rectangular having upstream and downstream gate faces 23, 25. A skirt 27 located within cavity 15 can help maintain the correct orientation of gate 21. Depending on the direction of fluid flow, either gate face 23, 25 will be the upstream side. For purposes of this disclosure, gate face 23 will be described as the upstream side, however if the fluid flow was reversed, gate face 25 would be the upstream side. Although embodiments of this disclosure are described with fluid flow in one direction, it can be understood that embodiments of this disclosure can function equally with fluid flow in either direction.

Gate 21 can be moved axially within gate cavity 15 between a gate closed position and a gate open position. Gate 21 can be moved by a rising stem, wherein the rising stem moves linearly outward from body 13 along gate axis 29 as gate 21 is being lifted. Alternately, as shown in FIG. 1, gate 21 can have a threaded nut on its upper end and be moved by a rotating non-rising stem. A bonnet 31 is mounted to the upper end of body 13. A hand wheel 33 is employed to cause the stem 35 to rotate. Alternately, a pneumatic, hydraulic or electric actuator could be utilized to cause axial movement of the stem 35. A stem seal located in bonnet 31 seals around the stem 35 and seals pressure and fluids within gate cavity 15. In yet other embodiments, valve 11 can have a balance stem valve with a duel bonnet for balancing the thrust pressures.

A metal seat ring 37, 39 is located between each gate face 23, 25 and valve body 13, at the intersection of each flow passage 17a, 17b, respectively, with gate cavity 15. Seat rings 37, 39 have holes 41 (FIG. 5) therethrough that register with the flow passages 17a, 17b. Each seat ring 37, 39 has an inward directed seat ring face 43 that is proximate to the gate faces 23, 25. The distance between the seat ring faces 43 of seat rings 37, 39 can be slightly greater than the thickness of gate 21. Seat rings 37, 39 can be biased by compliant mechanisms toward each other. A sealing interface 40 between a gate face 23, 25 and seat ring face 43 occurs when the gap 38 between the sealing components of gate face 23, 25 and seat ring face 43 becomes minimal, or nonexistent. This typically occurs between downstream gate face 25 and seat ring face 43 as shown in FIG. 2, but can occur instead between upstream gate face 23, and seat ring face 43, or between both gate faces 23, 25 and seat ring face 43 simultaneously, as shown in FIG. 1.

Gate 21 can be a single slab or can be a split gate type. Gate 21 has a flow passage or opening 45 (FIG. 2) that registers with flow passages 17a, 17b and holes 41 in seat rings 37, 39 when the gate is in a gate open position. The inner diameter of gate opening 45 is typically the same as holes 41 in seat rings 37, 39 and flow passages 17a, 17b. In the gate closed position, the gate opening 45 is not aligned with the flow passages 17a, 17b and the gate 21 instead blocks the flow passages 17a, 17b. When the gate 21 is in the gate closed position, the fluid forces on upstream gate face 23 will cause the downstream gate face 25 of gate 21 to seal against the seal surface of downstream seat ring 39. In certain designs of valve 11, the distance between the seal surfaces of seat rings 37, 39 is slightly greater than the thickness of gate 21. In such an embodiment, there may be times when upstream gate face 23 does not seal against the seal surface of seat ring 37 and fluids can escape through the gap 38 (FIG. 2) between upstream gate face 23 and seat ring 37 and flow into cavity 15. The stem seal (not shown) will prevent fluids from escaping from the gate cavity 15.

Figure 2:
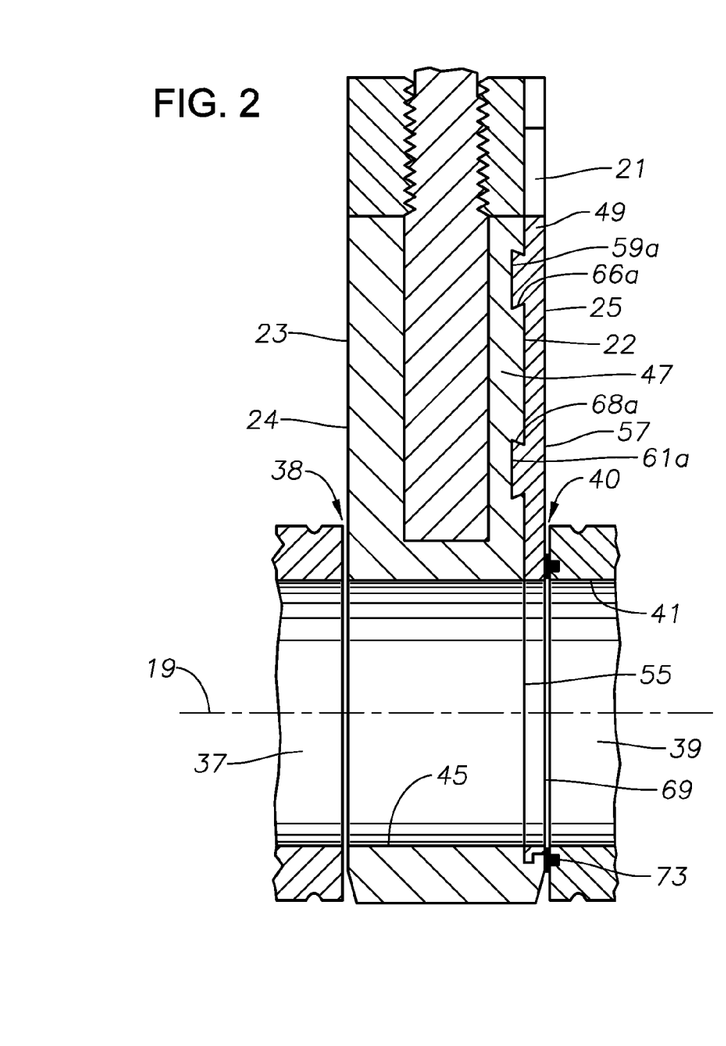
FIG. 2 is a section view of a portion of an embodiment of the gate and gate seats of the gate valve of FIG. 1.
Figure 3:
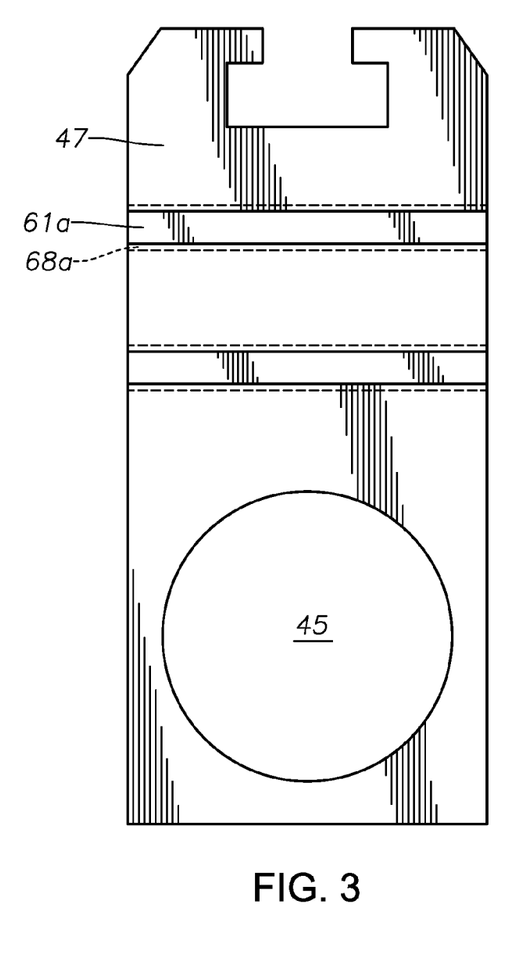
FIG. 3 is a front elevational view of the gate body of the gate valve of FIG. 1.
Figure 4:
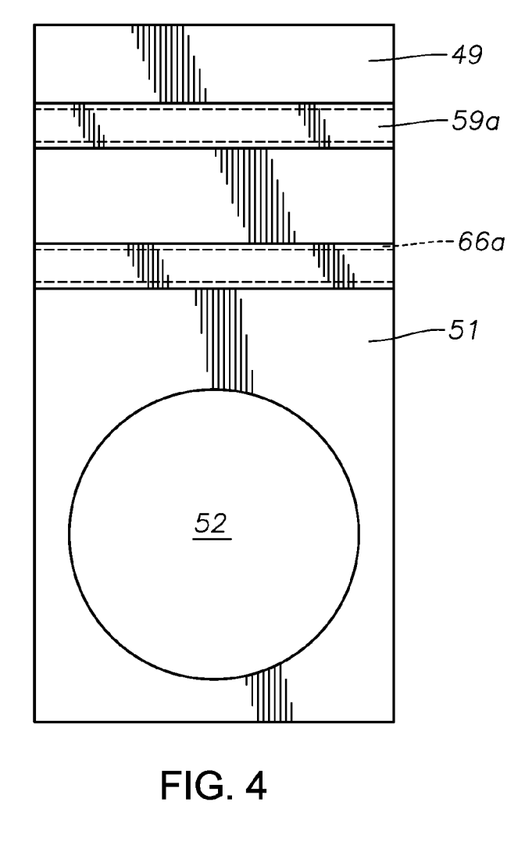
FIG. 4 is a back elevational view of the gate insert of the gate valve of FIG. 1.

Looking at FIGS. 1-3, gate 21 includes a gate body 47 with upstream and downstream gate faces 23, 25 located on opposite sides of the gate body 47. At least one of the gate faces 23, 25 comprises a removable gate insert 49. In the embodiment of FIG. 2, downstream gate face 25 comprises removable gate insert 49 that is releasably mated to downstream gate body face 22. In such an embodiment, upstream gate face 23 can be upstream gate body face 24, which is an integral part of gate body 47. In such an embodiment, downstream gate body face 22 is recessed relative to an outermost surface of gate 21 in order to accommodate the gate insert 49. Upstream gate body face 24 is flush with an outermost surface of gate 21.

In other embodiments, as shown in FIG. 1, both gate faces 23, 25 are removable gate inserts 49 which are removably mated to gate body faces 22, 24. Regardless of whether the outermost surfaces of gate 21 comprise removable gate inserts 49 or are gate body faces 22, 24, such outermost surfaces are designated as gate faces 23, 25. Additionally, regardless of whether the outermost surface of gate body 47 is recessed relative to an outermost surface of gate 21 or flush with an outermost surface of gate 21, the outermost surfaces of gate body 47 are designated as gate body faces 22, 24.

Gate inserts 49 are formed of a material that is harder and more wear resistant than the material of the gate body 47. The wear resistance of a material can be a function of the hardness and tensile strength of a material. In addition, a lower coefficient of friction will make a material more wear resistant because the stresses on a material will reduce as the coefficient of friction between the slidingly engaged surfaces is reduced. The tensile strength of the material used to form gate body 47 can be 60,000 psi and greater. Gate body 47 can be formed, for example, of 4130 steel which is commonly known as Chromium-molybdenum steel, with a tensile strength of 81,000 psi and a hardness of 156 HB (as measured on the Brinell scale, which equates to approximately 158 HV as measured on the Vickers scale). Alternatively if gate body 47 is formed of 17-4 stainless steel, the tensile strength can be 105,000 psi and the hardness can be 277 HB (which equates to approximately 285 HV). Gate body 47 may have a coating, such as for example tungsten carbide, that is sprayed on, welded on, or electrically applied in order to increase the hardness of the surfaces of gate body 47 to 800 HV or greater.

Gate inserts 49 can be formed, for example, of ceramics, composites, or other material that is harder and more wear resistant than the material of the gate body 47. One such material can be partially stabilized zirconia, which can have a hardness of 1300 HV or greater. The tensile strength of the material of the gate inserts 49 can be higher or lower than the tensile strength of the material of the gate body 47, however, the combination of hardness, tensile strength, coefficient of friction, and other factors which affect wear resistance will result in a wear resistance of the material of gate inserts 49 that is greater than the wear resistance of gate body 47.

Each gate insert 49 has a plate portion 51 with axially extending sides 53 (FIG. 5) on either side of plate portion 51. Gate insert 49 has a width that is essentially similar to the width of the gate body 47. The gate insert also has a hole 52 with a diameter generally similar to the diameter of gate opening 45. Plate portion 51 has an inner surface 55 (FIG. 1) and an opposing outer surface 57. Outer surface 57 is a flat surface that slidingly engages seat ring faces 43. Gate inserts 49 are removably coupled to the gate body 47 so that gate inserts 49 can be removed and replaced if they wear. Gate inserts 49 could also be removed and reused on other valves 11. In order to removably couple gate insert 49 to gate body 47, a system of mating profiles can be used. An external profile, such as ribs 59, can mate with a corresponding internal profile such as channels 61. The ribs 59 can be located on either the inner surface of 55 of gate insert 49 or a gate body face 22, 24 of gate body 47. The corresponding channels 61 will be located on the opposite of the gate insert 49 or the gate body face 22, 24 of gate body 47, as applicable. The ribs 59 and channels 61 can extend generally in the direction of gate axis 29 or can extend generally perpendicular to the gate axis 29.

In the embodiment of FIGS. 1-4, gate insert 49 can have a rib 59a. Rib 59a if formed on the inner surface 55 of gate insert 49 and extends from one side 53 of the gate insert 49 towards the other side 53 of the gate insert 49. Rib 59a has an insert shoulder 66a. Gate body 47 has a shaped channel 61a that engages the rib 59a. Channel 61a extends across gate body face 22, 24 in a direction generally perpendicular to gate axis 29. Channel 61a has a channel shoulder 68a. Insert shoulder 66a engages channel shoulder 68b for preventing outward movement of the gate insert 49 relative to the gate body 47. Rib 59a can be formed as a dovetail, as shown in FIG. 1. Ribs 59 and channel 61 can have an alternative shape that contains mating shoulders to prevent outward movement of the gate insert 49 relative to gate body 47 in a direction normal to the outer side of the body, such as in a direction parallel to axis 19.

In the embodiments of FIGS. 1-4, gate inserts 49 can be slid on to gate body 47 by lining up rib 59a of the gate insert 49 with the channel 61a of the gate body face 22, 24, and sliding the gate insert 49 onto the gate body 47 in a plane that is parallel to the plane of the outer side of the gate body, in a direction generally perpendicular to gate axis 29. A bonding agent can be used as an alternative to, or in addition to the channel 61a and rib 59a to removably couple the gate insert 49 to the gate body 47. The bonding agent can be, for example, an adhesive material.

Figure 5:
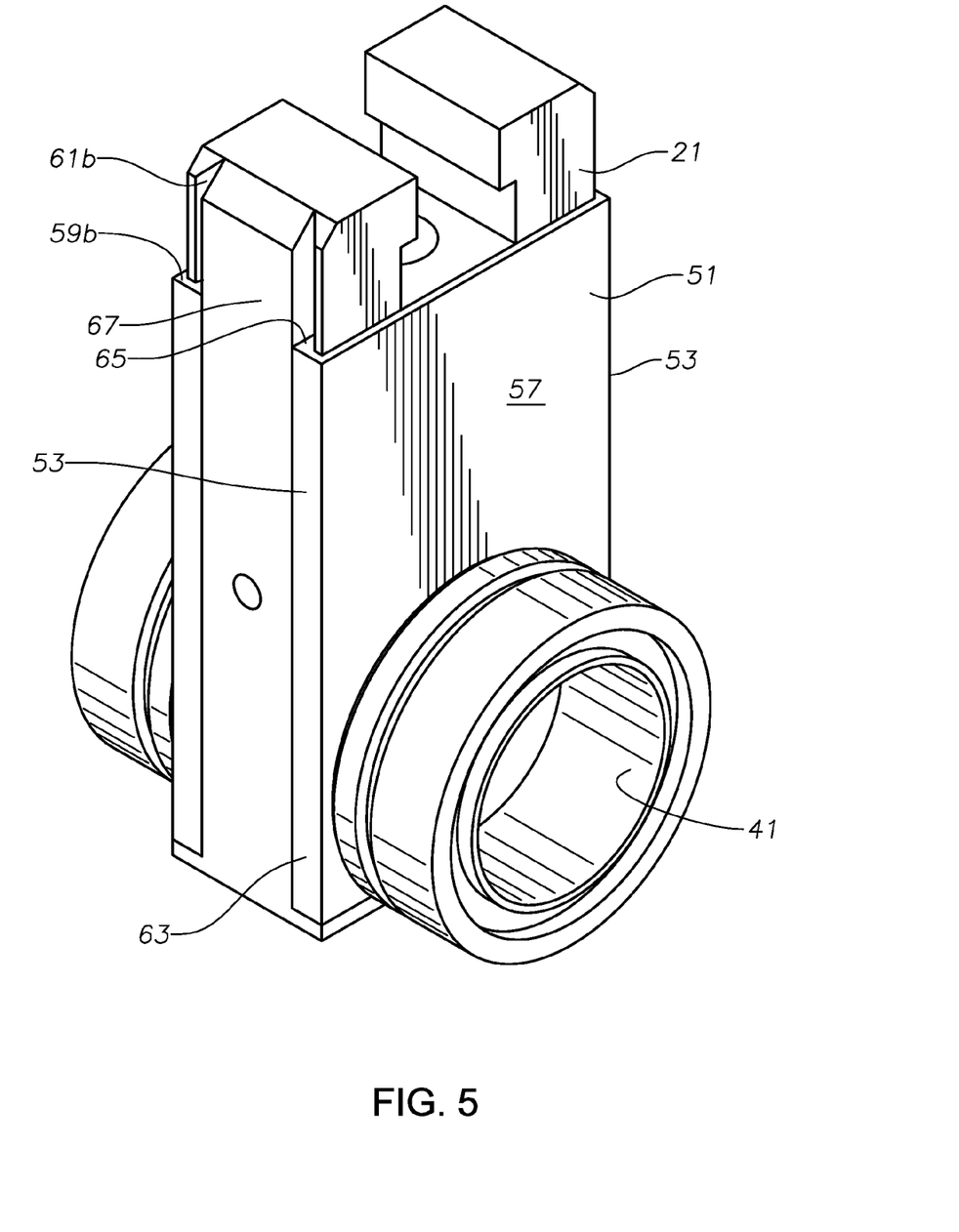
FIG. 5 is a perspective view of an alternative embodiment of the gate and seat rings of the gate valve of FIG. 1.
Figure 6:
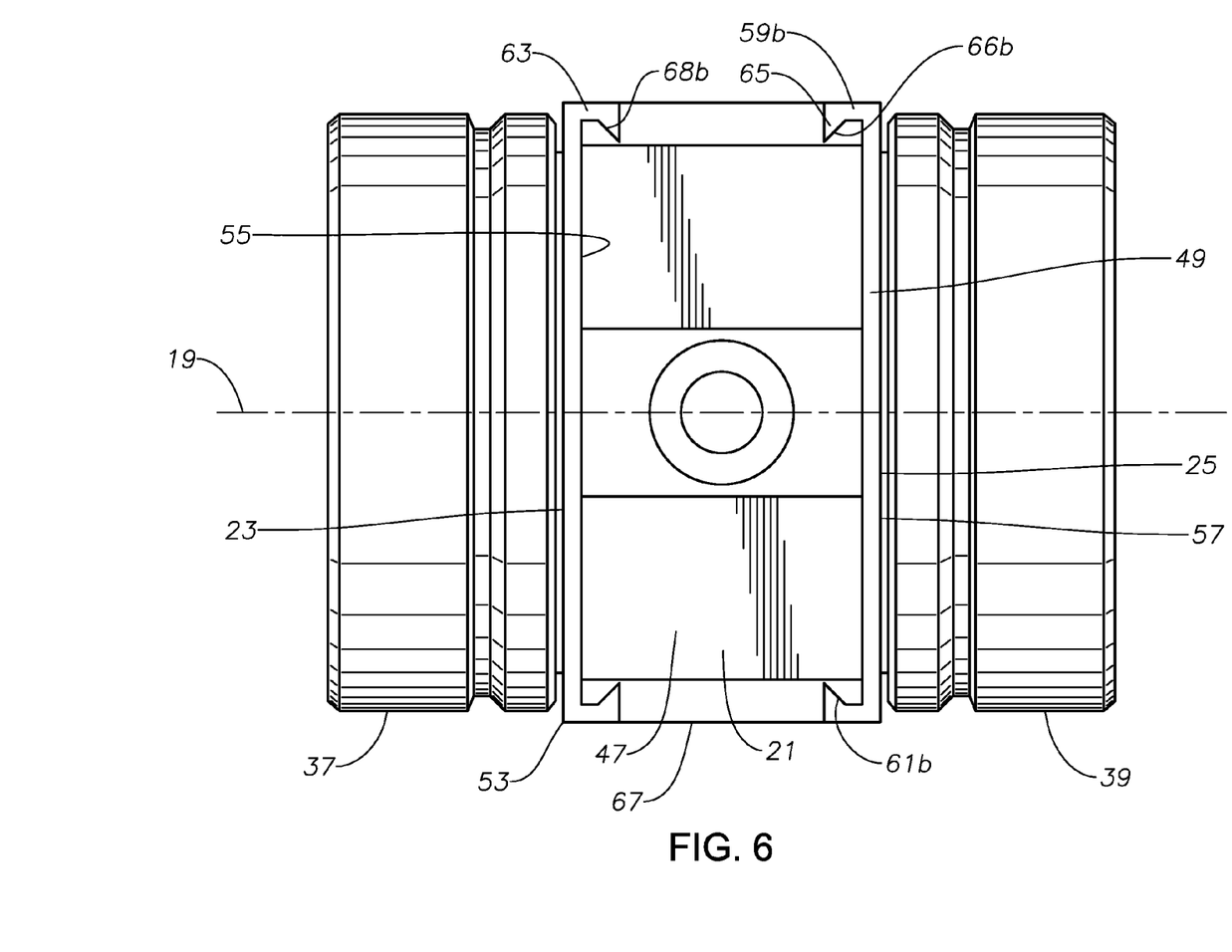
FIG. 6 is a top plan view of portion of the gate and seat rings of FIG. 5.

In the embodiment of FIGS. 5-6 rib 59b extends from the edge of inner surface 55 of gate insert 49. Rib 59b extends axially along each side 53 of gate insert 49. A side portion 63 of rib 59b extends from and is generally perpendicular to plate portion 51. A lip portion 65 of gate insert 49 in turn extends from and generally perpendicular to side portion 63 so that lip portion 63 is generally parallel to plate portion 51 of gate insert 49. Lip portion 65 has an insert shoulder 66b.

Gate body 47 has two opposing gate sides 67, each gate side 67 extending between the downstream gate face 25 and the upstream gate face 23. Axially extending channels 61b are located on gate sides 67 of gate body 47 and have channel shoulders 68b. Insert shoulder 66b of lip portion 63 engages channel shoulder 68b for preventing outward movement of the gate insert 49 relative to the gate body 47. In such an embodiment, gate inserts 49 can be slid on to gate body 47 by lining up rib 59b of the gate insert 49 with the channel 61b of the gate body 47, and sliding the gate insert 49 into the gate body 47 in a plane that is parallel to the plane of the outer side of the gate body, in a direction generally parallel to gate axis 29. A bonding agent can be used as an alternative to, or in addition to the channel 61b and rib 59b to removably couple the gate insert 49 to the gate body 47.

Figure 7:
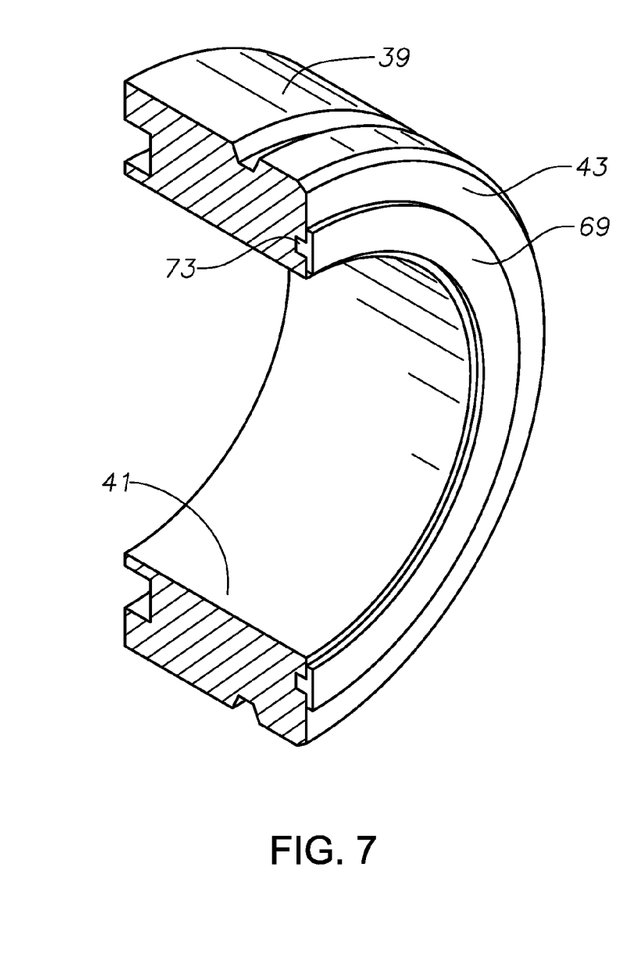
FIG. 7 is a sectional perspective view of the seat ring and seat face insert of the gate valve of FIG. 1.

Looking at FIGS. 1 and 7, downstream seat ring 39 has a removable ring shaped seat face insert 69 for selective sealing engagement with the gate insert 49. In certain embodiments, there is only one seat face insert 69. In other embodiments, such as shown in FIG. 1, both seat rings 37, 39 have removable ring shaped seat face inserts 69. The seat face inserts 69 circumscribe holes 41 and can have an inner diameter that is substantial similar to the diameter of holes 41. Alternatively, the seat face inserts 69 can have an inner diameter that is greater than the diameter of holes 41.

The seat face inserts 69 are formed of a material harder and more wear resistant as compared to the seat rings 37, 39. The tensile strength of the material used to form seat rings 37, 39 can be 60,000 psi and greater. Seat rings 37, 3947 can be formed, for example, of 4130 steel which is commonly known as Chromium-molybdenum steel, with a tensile strength of 81,000 psi and a hardness of 156 HB (which equates to approximately 158 HV). Alternatively if seat rings 37, 39 are formed of 17-4 stainless steel, the tensile strength can be 105,000 psi and the hardness can be 277 HB (which equates to approximately 285 HV). Seat rings 37, 39 may have a coating, such as for example tungsten carbide, that is sprayed on, welded on, or electrically applied in order to increase the hardness of the surfaces of seat rings 37, 39 to 800 HV or greater.

The seat face inserts 69 can be formed, for example, of ceramics, composites, or other material that is harder and more wear resistant than the material of the gate body 47. One such material can be partially stabilized zirconia, which can have a hardness of 1300 HV or greater. The tensile strength of the material of the seat face inserts 69 can be higher or lower than the tensile strength of the material of the seat rings 37, 39, however, the combination of hardness, tensile strength, coefficient of friction, and other factors which affect wear resistance will result in a wear resistance of the material of the seat face inserts 69 that is greater than the wear resistance of seat face inserts 69.

Seat ring face 43 of seat rings 37, 39 has a circular groove 71 that circumscribes holes 41. Seat face inserts 69 have a base 73 that mates with the circular groove 71 of the seat ring 37, 39 for removably coupling the seat face insert 69 to the seat rings 37, 39. The base 73 of the seat face insert 69 can be interference fit within the circular groove 71 of the seat ring 37, 39. Alternatively or in addition to the interference fit, the seat face insert 69 can be removably coupled to the seat ring 37, 39 with a bonding agent.

The gate valve described herein has significant advantages. Using more wear resistant materials for the seat face inserts 69 and the gate inserts 49 as the sealing faces of the seat ring face 43 and gate faces 23, 25 will increase the life of the valve 11. If the inserts 69, 49 do wear or fail, they can be removed and replaced with relative ease without the need to replace the entire gate 21. This improves the cost effectiveness of the valve 11 and reduces maintenance and repair costs and operational downtimes.

The terms "vertical", "horizontal", "upward", "downward", "above", and "below" are used herein only for convenience because valve 11 may be installed in various positions, other than with the stem 35 pointing upward.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A gate valve, comprising:
    a valve body with a flow passage intersected by a gate cavity;
    a gate with an axis and a gate body, the gate body having a downstream gate body face, and an upstream gate body face on an opposite side of the gate body, the gate being axially movable in the gate cavity between a gate closed position and a gate open position, the gate having a gate opening that registers with the flow passage when the gate is in the gate open position;
    a seat ring located between each gate body face and the valve body, at the intersection of the flow passage and the gate cavity, each seat ring having a seat ring face proximate to the gate;
    at least one removable insert located between one of the seat ring faces and one of the gate body faces, the insert being removably coupled to one of the faces and formed of a material harder and more wear resistant as compared to the gate body and the seat ring; and
    a channel on the one of the faces, and a rib on the removable insert for mating with the channel and removably coupling the removable insert to the one of the faces.

2. The gate valve of claim 1, wherein at least one of the inserts is removably coupled to the gate body and comprises a preformed member with a width that is essentially similar to a width of the gate body, the insert further comprising a hole with a diameter generally similar to a diameter of the gate opening.

3. The gate valve of claim 1, wherein at least one of the inserts is removably coupled to the gate body, and wherein the rib has an external profile and the channel has an internal profile for mating with the external profile, for preventing outward movement of the insert relative to the gate body.

4. The gate valve of claim 1, wherein:
    at least one of the inserts has a plate portion with a flat outer surface for slidingly engaging one of the seat ring faces, the insert further having an inner surface opposite the outer surface, the inner surface having the rib extending therefrom; and
    the gate body has the channel for engaging the rib to removably couple the insert to the gate body.

5. The gate valve of claim 1, wherein:
    at least one of the inserts has a plate portion with axially extending sides, the plate portion having an inner surface and an opposing outer surface, the inner surface having the rib extending from one side of the insert towards the other side of the insert; and
    one of the gate body faces has the channel for engaging the rib to removably couple the insert to the gate body.

6. The gate valve of claim 1, wherein:
    the rib includes a first and second rib and at least one of the inserts has a plate portion with axially extending sides and the first and second ribs extending from an inner surface of the insert along each side; and
    the channel includes a first and second channel that extend axially and the gate body has two opposing gate sides, each gate side extending between the downstream gate body face and the upstream gate body face, each gate side having one of the first and second channel, for engaging one of the first and second ribs to removably couple the insert to the gate body.

7. The gate valve of claim 1, wherein at least one of the inserts is removably coupled to one of the seat ring faces.

8. The gate valve of claim 7, wherein each seat ring has a hole extending through the seat ring that registers with the flow passage of the valve body, and the insert is a ring shaped member that circumscribes the hole of the seat ring.

9. The gate valve of claim 1, wherein:
    each seat ring has a hole extending through the seat ring that registers with the flow passage of the valve body;
    the channel is a circular groove and at least one of the seat rings further comprises the circular groove that circumscribes the hole; and
    at least one of the inserts has the rib for mating with the circular groove of the seat ring for removably coupling the insert to the seat ring.

10. The gate valve of claim 1, wherein the insert is removably coupled to one of the faces with a bonding agent.

11. A gate valve, comprising:
    a valve body with a flow passage intersected by a gate cavity;
    a gate with an axis, a gate body, the gate body having a downstream gate body face, and an upstream gate body face on an opposite side of the gate body as the downstream gate body face, the gate being axially movable in the gate cavity between a gate closed position and a gate open position, the gate having a gate opening that registers with the flow passage when the gate is in the gate open position;
    a seat ring located between each gate body face and the valve body, at the intersection of the flow passage and the gate cavity, each seat ring having a hole extending through the seat ring that registers with the flow passage of the valve body, and a seat ring face proximate to the gate, wherein at least one of the seat ring faces forms a sealing interface with the gate;
    at least one removable insert being located at the sealing interface between one of the gate body faces and one of the seat ring faces, the insert being formed of a material harder and more wear resistant as compared to the gate body and the seat ring; and
    a channel on one of the faces, and a rib on the removable insert for mating with the channel and removably coupling the removable insert to the one of the faces.

12. The gate valve of claim 11, wherein the insert is removably coupled to one of the faces with a bonding agent.

13. The gate valve of claim 11, wherein the sealing interface is located between the downstream gate body face and the seat ring face of one of the seat rings.

14. The gate valve of claim 11, wherein at least one of the inserts is removably coupled to the gate body and another at least one of the inserts is removably coupled to one of the seat rings.

15. The gate valve of claim 11, wherein the rib has an external profile and the channel has an internal profile for mating with the external profile, the channel being located on the gate body, for preventing outward movement of the insert relative to the gate body.

16. The gate valve of claim 11, wherein:
the channel is a circular groove and at least one of the seat rings further includes the circular groove, that circumscribes the hole; and
at least one of the inserts is a ring shaped member that has the rib for mating with the circular groove for removably coupling the insert to the seat ring.

17. A gate valve, comprising:
a valve body with a flow passage intersected by a gate cavity;
a gate with an axis, a gate body, a downstream gate face, and an upstream gate face on an opposite side of the gate body as the downstream gate face, the gate being axially movable in the gate cavity between a gate closed position and a gate open position;
a seat ring located between each gate face and the valve body, at the intersection of the flow passage and the gate cavity, each seat ring having a hole extending through the seat ring that registers with the flow passage of the valve;
at least one gate face comprises a removable gate insert formed of a material harder and more wear resistant as compared to the gate body, the gate insert having an inner surface that engages an outer surface of the gate body; and
a plurality of elongated mating ribs and channels located on the gate insert and the gate body, the ribs and channels having mating shoulders to prevent the gate insert from being moved away from the gate body in a direction normal to a plane containing the outer surface of the gate body.

18. The gate valve of claim 17, wherein:
each gate insert has a plate portion with axially extending sides and the rib extends axially along each side; and
the gate body has two opposing gate sides, each gate side extending between the downstream gate face and the upstream gate face, and the channels extend along each gate side.

19. The gate valve of claim 17, wherein:
each gate insert has a plate portion with axially extending sides;
the ribs extend from one side of the gate insert towards the other side of the gate insert on the inner surface of each gate insert; and
the channels extend generally perpendicular to the axis of the gate on the outer surface of the gate body.

20. The gate valve of claim 17, wherein at least one of the seat rings has a removable ring shaped seat face insert for selective sealing engagement with one of the gate inserts, the seat face insert having a base for mating with a circular groove of the seat ring for removably coupling the seat face insert to the seat ring, and being formed of a material harder and more wear resistant as compared to the seat ring.

* * * * *